United States Patent
Marble et al.

(10) Patent No.: US 12,466,224 B1
(45) Date of Patent: Nov. 11, 2025

(54) SUSPENSION CAMBER OPTIMIZATION

(71) Applicant: GM Global Technology Operations LLC, Detroit, MI (US)

(72) Inventors: Robert Patrick Marble, White Lake, MI (US); Nate Maye-Bloom, Clawson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 19/089,518

(22) Filed: Mar. 25, 2025

(51) Int. Cl.
*B60G 7/00* (2006.01)
*B60G 17/015* (2006.01)

(52) U.S. Cl.
CPC ......... *B60G 7/003* (2013.01); *B60G 17/0152* (2013.01); *B60G 2200/18* (2013.01); *B60G 2204/148* (2013.01); *B60G 2800/24* (2013.01)

(58) Field of Classification Search
CPC ........................ B60G 7/003; B60G 17/0152; B60G 2200/18; B60G 2204/148; B60G 2800/24
See application file for complete search history.

(56) References Cited

U.S. PATENT DOCUMENTS

2024/0100898 A1\* 3/2024 Chang ..................... B60G 3/18

\* cited by examiner

*Primary Examiner* — Jason D Shanske
*Assistant Examiner* — Matthew James O'Neill
(74) *Attorney, Agent, or Firm* — Vivacqua Crane, PLLC

(57) ABSTRACT

A suspension for a vehicle includes a knuckle, a lower control arm, an upper control arm, including an inner segment and an outer segment pivotally connected to one another, and a camber gain link interconnecting the upper control arm and the lower control arm, a pivotal position of the inner segment relative to the outer segment defining an effective length of the upper control arm and a camber angle of the knuckle, the camber gain link adapted to secure the pivotal connection of the inner segment and the outer segment and prevent pivotal movement of the inner segment and the outer segment relative to one another, thereby establishing a pivotal position of the inner segment relative to the outer segment, the effective length of the upper control arm and the camber angle of the knuckle.

20 Claims, 6 Drawing Sheets

SUSPENSION CAMBER OPTIMIZATION

INTRODUCTION

The present invention relates generally to suspension components within a vehicle and control of camber angle.

Current suspension systems force vehicles to compromise between lateral and longitudinal traction optimization. When a vehicle is approaching maximum lateral acceleration, additional camber angle is desired, however, during acceleration near zero camber angle is desired to achieve optimal traction. Further, challenges of packaging various elements in the vehicle force lengths of suspension components to be less than optimal, compromising the suspension kinematics.

Thus, while current methods and systems achieve their intended purpose, there is a need for an improved system and method of controlling camber angle in a vehicle suspension by selectively changing an effective length of the upper control arm of the suspension.

SUMMARY

According to several aspects of the present disclosure, a suspension for a vehicle includes a knuckle adapted to support a wheel hub, a lower control arm interconnecting a lower portion of the knuckle, at a lower connection point, to a structural member of the vehicle, wherein the lower control arm is pivotally connected to the structural member of the vehicle and pivotally connected to the lower portion of the knuckle, an upper control arm interconnecting an upper portion of the knuckle to a structural member of the vehicle and including an inner segment and an outer segment, wherein the inner segment of the upper control arm is pivotally connected to the structural member of the vehicle, the outer segment of the upper control arm is connected to the upper portion of the knuckle at an upper connection point, and the inner segment and the outer segment are pivotally connected to one another, and a camber gain link interconnecting the upper control arm and the lower control arm, the camber gain link connected to the upper control arm at the pivotal connection of the inner segment and the outer segment, a pivotal position of the inner segment relative to the outer segment defining a lateral distance between the pivotal connection of the inner segment to the structural member of the vehicle and the upper connection point and an effective length of the upper control arm, the knuckle pivotally moveable about the lower connection point, such that the effective length of the upper control arm defines a camber angle of the knuckle, and the camber gain link adapted to secure the pivotal connection of the inner segment and the outer segment and prevent pivotal movement of the inner segment and the outer segment relative to one another, thereby establishing a pivotal position of the inner segment relative to the outer segment, the effective length of the upper control arm and the camber angle of the knuckle.

According to another aspect, the camber gain link includes a first distal end that is connected to the upper control arm at the pivotal connection of the inner segment and the outer segment, and a second distal end that is connected to the lower control arm, wherein, changing a position of the pivotal connection of the inner segment and the outer segment relative to the lower control arm, changes the effective length of the upper control arm and the camber angle of the knuckle.

According to another aspect, the camber gain link includes a first section, a second section and a connection between the first section and the second section that is adapted to allow a position of the first section and the second section, relative to one another, to be changed, thereby allowing a length of the camber gain link to be selectively changed.

According to another aspect, the connection between the first section and the second section of the camber gain link includes a turnbuckle adapted to allow the length of the camber gain link to be selectively changed.

According to another aspect, the connection between the first section of the camber gain link and the second section of the camber gain link includes an actuator in communication with a system controller that is adapted to automatically change the length of the camber gain link based on data collected by the system controller from a plurality of onboard sensors within the vehicle.

According to another aspect, the actuator is adapted to default to a pre-determined length of the camber gain link.

According to another aspect, the actuator is one of a motor/gear arrangement, an electronic, hydraulic or pneumatic actuator, a linear actuator or solenoid.

According to another aspect, the first distal end of the camber gain link includes a first camber gain link connection point and a second camber gain link connection point, wherein connection of the first distal end of the camber gain link to the upper control arm at the first camber gain link connection point defines a first position of the pivotal connection of the inner segment and the outer segment relative to the lower control arm and a first camber angle of the knuckle, and connection of the first distal end of the camber gain link to the upper control arm at the second camber gain link connection point defines a second position of the pivotal connection of the inner segment and the outer segment relative to the lower control arm and a second camber angle of the knuckle.

According to another aspect, the second distal end of the camber gain link includes a first camber gain link connection point and a second camber gain link connection point, wherein connection of the second distal end of the camber gain link to the lower control arm at the first camber gain link connection point defines a first position of the pivotal connection of the inner segment and the outer segment relative to the lower control arm and a first camber angle of the knuckle, and connection of the second distal end of the camber gain link to the lower control arm at the second camber gain link connection point defines a second position of the pivotal connection of the inner segment and the outer segment relative to the lower control arm and a second camber angle of the knuckle.

According to another aspect, the lower control arm includes a first connection point, offset from an axis of the lower control arm, and a second connection point, along the axis of the lower control arm, wherein connection of the second distal end of the camber gain link to the first connection point of the lower control arm defines a first position of the pivotal connection of the inner segment and the outer segment relative to the lower control arm and a first camber angle of the knuckle, and connection of the second distal end of the camber gain link to the second connection point of the lower control arm defines a second position of the pivotal connection of the inner segment and the outer segment relative to the lower control arm and a second camber angle of the knuckle.

According to another aspect, the lower control arm includes a first connection point, along an axis of the lower control arm, and a second connection point, along the axis of the lower control arm and spaced from the first connection point, wherein connection of the second distal end of the camber gain link to the first connection point of the lower control arm defines a first position of the pivotal connection of the inner segment and the outer segment relative to the lower control arm and a first camber angle of the knuckle, and connection of the second distal end of the camber gain link to the second connection point of the lower control arm defines a second position of the pivotal connection of the inner segment and the outer segment relative to the lower control arm and a second camber angle of the knuckle.

According to several aspects of the present disclosure, a method of controlling camber angle within a suspension for a vehicle, wherein the suspension includes a knuckle adapted to support a wheel hub, a lower control arm interconnecting a lower portion of the knuckle, at a lower connection point, to a structural member of the vehicle, wherein the lower control arm is pivotally connected to the structural member of the vehicle and pivotally connected to the lower portion of the knuckle, an upper control arm interconnecting an upper portion of the knuckle to a structural member of the vehicle and including an inner segment and an outer segment, wherein the inner segment of the upper control arm is pivotally connected to the structural member of the vehicle, the outer segment of the upper control arm is connected to the upper portion of the knuckle at an upper connection point, and the inner segment and the outer segment are pivotally connected to one another, and a camber gain link interconnecting the upper control arm and the lower control arm, the camber gain link connected to the upper control arm at the pivotal connection of the inner segment and the outer segment, a pivotal position of the inner segment relative to the outer segment defining a lateral distance between the pivotal connection of the inner segment to the structural member of the vehicle and the upper connection point and an effective length of the upper control arm, and the knuckle pivotally moveable about the lower connection point, such that the effective length of the upper control arm defines a camber angle of the knuckle, the method including securing, with the camber gain link, the pivotal connection of the inner segment and the outer segment and preventing pivotal movement of the inner segment and the outer segment relative to one another, thereby establishing a pivotal position of the inner segment relative to the outer segment, the effective length of the upper control arm and the camber angle of the knuckle.

According to another aspect, the camber gain link includes a first distal end that is connected to the upper control arm at the pivotal connection of the inner segment and the outer segment, and a second distal end that is connected to the lower control arm, the method further including changing a position of the pivotal connection of the inner segment and the outer segment relative to the lower control arm, changing the effective length of the upper control arm and the camber angle of the knuckle.

According to another aspect, the camber gain link includes a first section, a second section and a connection between the first section and the second section, and the changing a position of the pivotal connection of the inner segment and the outer segment relative to the lower control arm, changing the effective length of the upper control arm and the camber angle of the knuckle further includes changing, with the connection between the first section and the second section, a position of the first section and the second section relative to one another, and changing a length of the camber gain link.

According to another aspect, the connection between the first section of the camber gain link and the second section of the camber gain link includes an actuator in communication with a system controller that is adapted to automatically change the length of the camber gain link based on data collected by the system controller from a plurality of onboard sensors within the vehicle, wherein the changing, with the connection between the first section and the second section, a position of the first section and the second section relative to one another further includes automatically actuating, with the system controller, the actuator based on data collected by the system controller from the plurality of onboard sensors.

According to another aspect, the first distal end of the camber gain link includes a first camber gain link connection point and a second camber gain link connection point, wherein connection of the first distal end of the camber gain link to the upper control arm at the first camber gain link connection point defines a first position of the pivotal connection of the inner segment and the outer segment relative to the lower control arm and a first camber angle of the knuckle, and connection of the first distal end of the camber gain link to the upper control arm at the second camber gain link connection point defines a second position of the pivotal connection of the inner segment and the outer segment relative to the lower control arm and a second camber angle of the knuckle, and the changing a position of the pivotal connection of the inner segment and the outer segment relative to the lower control arm, changing the effective length of the upper control arm and the camber angle of the knuckle further includes one of disconnecting the first distal end of the camber gain link from the upper control arm at the first camber gain link connection point and connecting the first distal end of the camber gain link to the upper control arm at the second camber gain link connection point, or disconnecting the first distal end of the camber gain link from the upper control arm at the second camber gain link connection point and connecting the first distal end of the camber gain link to the upper control arm at the first camber gain link connection point.

According to another aspect, the second distal end of the camber gain link includes a first camber gain link connection point and a second camber gain link connection point, and wherein connection of the second distal end of the camber gain link to the lower control arm at the first camber gain link connection point defines a first position of the pivotal connection of the inner segment and the outer segment relative to the lower control arm and a first camber angle of the knuckle, and connection of the second distal end of the camber gain link to the lower control arm at the second camber gain link connection point defines a second position of the pivotal connection of the inner segment and the outer segment relative to the lower control arm and a second camber angle of the knuckle, and the changing a position of the pivotal connection of the inner segment and the outer segment relative to the lower control arm, changing the effective length of the upper control arm and the camber angle of the knuckle further includes one of disconnecting the second distal end of the camber gain link from the lower control arm at the first camber gain link connection point and connecting the second distal end of the camber gain link to the lower control arm at the second camber gain link connection point, or disconnecting the second distal end of the camber gain link from the lower control arm at the second camber gain link connection point and connecting the second distal end of the camber gain link to the lower control arm at the first camber gain link connection point.

According to another aspect, the lower control arm includes a first connection point, offset from an axis of the lower control arm, and a second connection point, along the axis of the lower control arm, and wherein connection of the second distal end of the camber gain link to the first connection point of the lower control arm defines a first position of the pivotal connection of the inner segment and the outer segment relative to the lower control arm and a first camber angle of the knuckle, and connection of the second distal end of the camber gain link to the second connection point of the lower control arm defines a second position of the pivotal connection of the inner segment and the outer segment relative to the lower control arm and a second camber angle of the knuckle, and the changing a position of the pivotal connection of the inner segment and the outer segment relative to the lower control arm, changing the effective length of the upper control arm and the camber angle of the knuckle further includes one of disconnecting the second distal end of the camber gain link from the lower control arm at the first connection point of the lower control arm and connecting the second distal end of the camber gain link to the lower control arm at the second connection point of the lower control arm, or disconnecting the second distal end of the camber gain link from the lower control arm at the second connection point of the lower control arm and connecting the second distal end of the camber gain link to the lower control arm at the first connection point of the lower control arm.

According to another aspect, the lower control arm includes a first connection point, along an axis of the lower control arm, and a second connection point, along the axis of the lower control arm and spaced from the first connection point, and wherein connection of the second distal end of the camber gain link to the first connection point of the lower control arm defines a first position of the pivotal connection of the inner segment and the outer segment relative to the lower control arm and a first camber angle of the knuckle, and connection of the second distal end of the camber gain link to the second connection point of the lower control arm defines a second position of the pivotal connection of the inner segment and the outer segment relative to the lower control arm and a second camber angle of the knuckle, and the changing a position of the pivotal connection of the inner segment and the outer segment relative to the lower control arm, changing the effective length of the upper control arm and the camber angle of the knuckle further includes one of disconnecting the second distal end of the camber gain link from the lower control arm at the first connection point of the lower control arm and connecting the second distal end of the camber gain link to the lower control arm at the second connection point of the lower control arm, or disconnecting the second distal end of the camber gain link from the lower control arm at the second connection point of the lower control arm and connecting the second distal end of the camber gain link to the lower control arm at the first connection point of the lower control arm.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
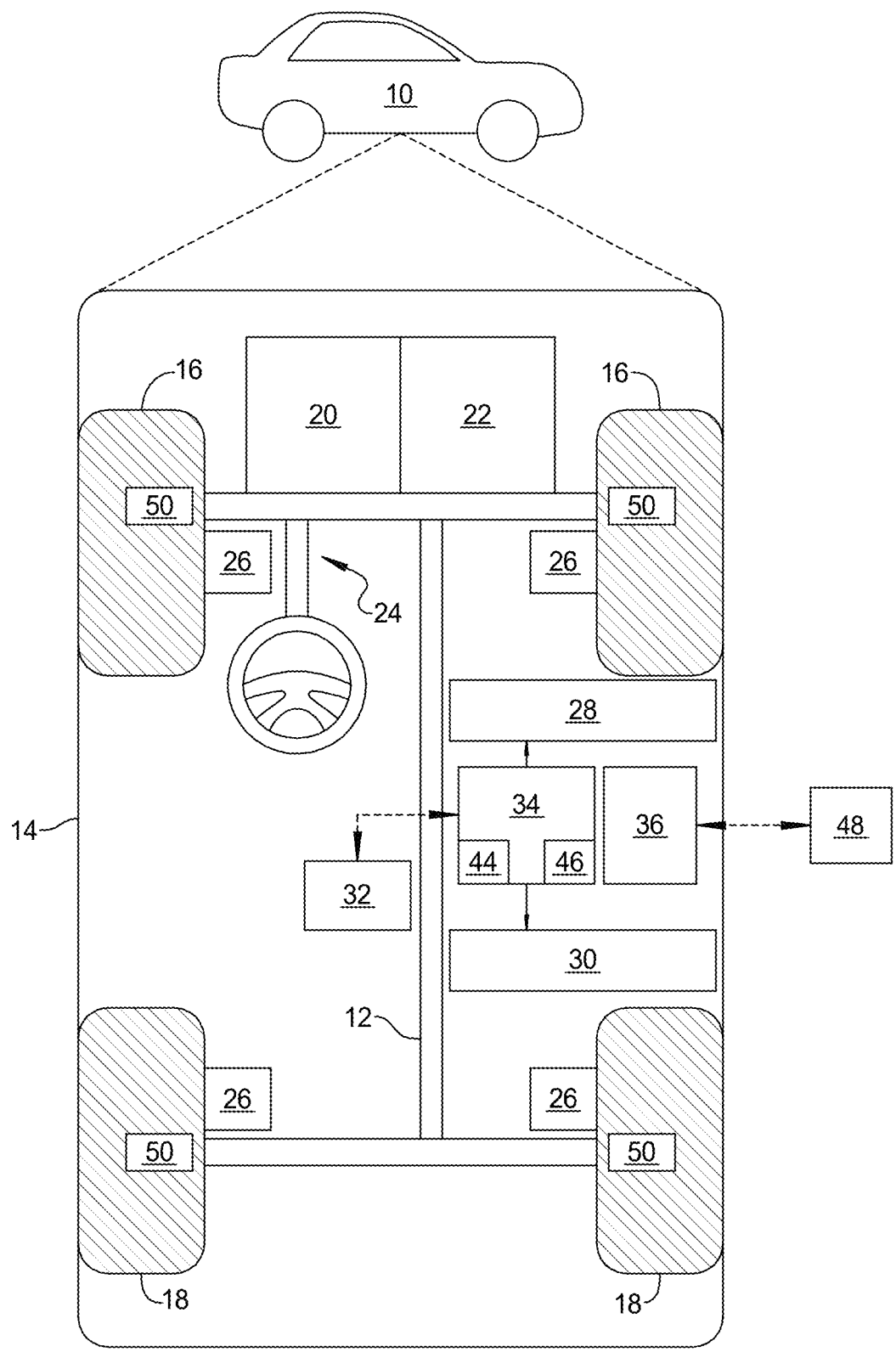
FIG. 1 is a schematic diagram of a vehicle having a suspension in accordance with an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of" any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about", with reference to percentages, comprises a variation of plus/minus 5%, "about", with reference to temperatures, comprises a variation of plus/minus five degrees, and "about", with reference to distances, comprises plus/minus 10%. In addition, disclosure of ranges includes disclosure of all values and further divided ranges within the entire range, including endpoints and sub-ranges given for the ranges.

Example embodiments will now be described more fully with reference to the accompanying drawings. In accordance with an exemplary embodiment, FIG. 1 shows a vehicle 10 with an associated suspension 50 in accordance with various embodiments. In general, the suspension 50 works in conjunction with other systems within the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

As shown, the vehicle 10 generally includes a propulsion system 20, a transmission system 22, a steering system 24, a brake system 26, a sensor system 28, an actuator system 30, at least one data storage device 32, a vehicle controller 34, and a communication system 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image. The plurality of sensing devices 40a-40n is used to determine information about an environment surrounding the vehicle 10. In an exemplary embodiment, the plurality of sensing devices 40a-40n includes at least one of a motor speed sensor, a motor torque sensor, an electric drive motor voltage and/or current sensor, an accelerator pedal position sensor, a coolant temperature sensor, a cooling fan speed sensor, a transmission oil temperature sensor, and sensors adapted to measure lateral and longitudinal acceleration.

Specific ones of the plurality of sensing devices 40a-40n used by the suspension 50 of the present disclosure include wheel position sensors, wheel accelerometers, the inertial measurement unit (IMU) or body acceleration sensors for monitoring/measuring motions in addition to capturing data from the steering system 24, brake system 26, throttle position and other signals from the vehicle 10 to control the suspension 50. These sensors are all commonly used by various sub-systems to provide adaptive dampening, active suspension, air suspension, etc. Various ones of the plurality of sensing devices 40a-40n are adapted to measure and/or calculate vehicle speed, yaw, and other signals, wherein such data is used to calculate lateral acceleration of the vehicle 10. If there is a difference between predicted and measured/calculated performance, a correction can be made to balance the vehicle. In another exemplary embodiment, the plurality of sensing devices 40a-40n further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40a-40n is capable of measuring distances in the environment surrounding the vehicle 10. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer-readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The communication system 36 is configured to wirelessly communicate information to and from other remote entities 48, such as but not limited to, other vehicles ("V2V" communication) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
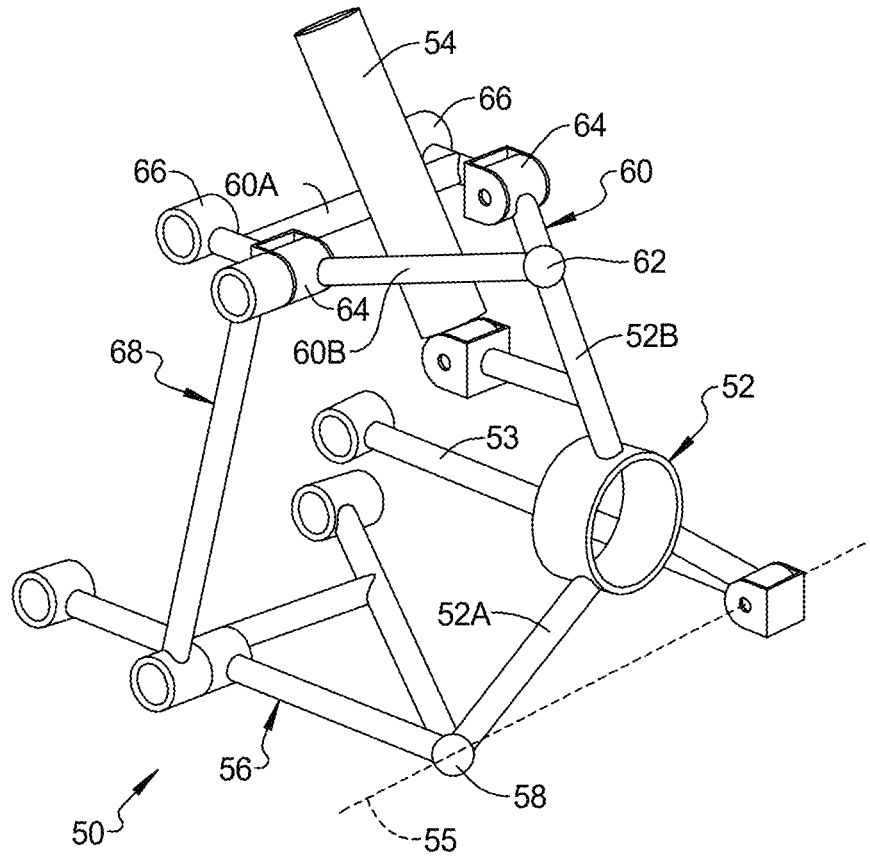
FIG. 2 is a perspective view of the suspension according to an exemplary embodiment.

Referring to FIG. 2, the suspension 50 for a vehicle 10, includes a knuckle 52 adapted to support a wheel 16, 18 thereon. As shown in FIG. 1, each of the four wheels 16, 18 includes a suspension 50 supporting the wheel 16, 18 on the chassis 12 of the vehicle 10. The suspension 50 includes various linkages adapted to allow the knuckle 52, and the wheel 16, 18 attached thereto, to move up and down to provide suspension characteristics for the vehicle 10. As shown, a shock absorber 54 is connected to the suspension 50 to dampen movement of the knuckle 52 relative to the chassis 12.

A lower control arm 56 interconnects a lower portion 52A of the knuckle 52, at a lower connection point 58, to a structural member (the chassis 12) of the vehicle 10. In various embodiments, the lower portion 52A of the knuckle 52 may be connected with other types of suspension links, such as, by way of non-limiting example, a spring link. The lower control arm 56 is pivotally connected to the chassis 12 of the vehicle 10 and pivotally connected to the lower portion 52A of the knuckle 52. An upper control arm 60 interconnects an upper portion 52B of the knuckle 52 to the chassis 12 of the vehicle 10 and includes an inner segment 60A and an outer segment 60B. The inner segment 60A of the upper control arm 60 is pivotally connected to the chassis 12 of the vehicle 10, the outer segment 60B of the upper control arm 60 is connected to the upper portion 52B of the knuckle 52 at an upper connection point 62, and the inner segment 60A and the outer segment 60B are pivotally connected to one another. As shown, the outer segment 60B of the upper control arm 60 has a generally V shape, and is pivotally connected to the inner segment 60A of the upper control arm 60 at two pivotal connection points 64. It should be understood by those skilled in the art that the novel features of the present disclosure are not limited to "A-arm" configurations, and the novel aspects of the present disclosure are applicable to other suspension configurations. The inner segment is pivotally connected to the chassis 12 at two pivotal connection points 66.

A camber gain link 68 interconnects the upper control arm 60 and the lower control arm 56. The camber gain link 68 is connected to the upper control arm 60 at one of the pivotal connections 64 of the inner segment 60A and the outer segment 60B. A pivotal position (angular relationship) of the inner segment 60A relative to the outer segment 60B defines a lateral distance between the pivotal connections 66 of the inner segment 60A to the chassis 12 and the upper connection point 62 and, thus, an effective length 70 of the upper control arm 60.

Figure 3A:
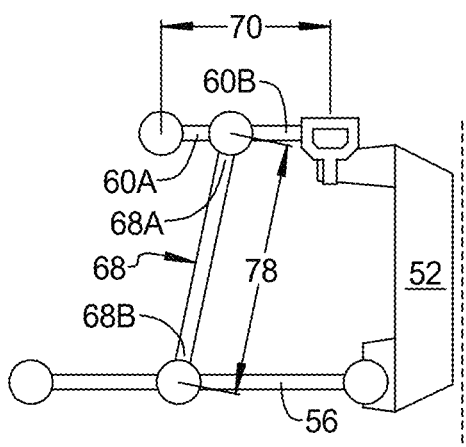
FIG. 3A is a side view of the suspension wherein a camber gain link has a first length.
Figure 3B:
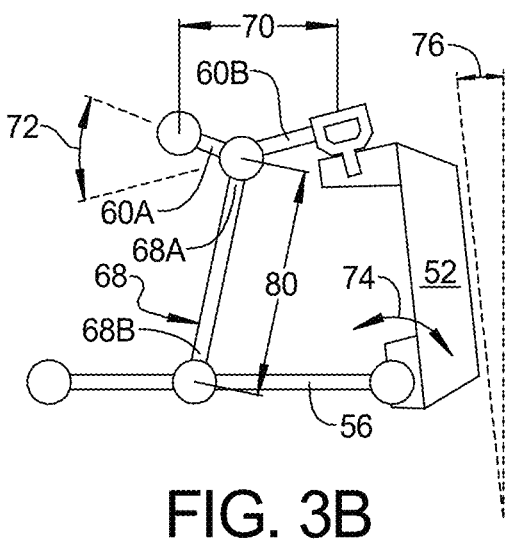
FIG. 3B is a side view of the suspension wherein the camber gain link has a second length.

Referring to FIG. 3A, the inner segment 60A and the outer segment 60B of the upper control arm 60 are co-linear, and thus, the effective length 70 of the upper control arm 60 is maximized. Referring to FIG. 3B, the inner segment 60A and the outer segment 60B of the upper control arm 60 are oriented at an angle 72 relative to one another, thus shortening the lateral distance between the pivotal connections 66 of the inner segment 60A to the chassis 12 and the upper connection point 62, and thus, the effective length 70 of the upper control arm 60.

The knuckle 52 is pivotally moveable about the lower connection point 58, as indicated by arrow 74. Referring again to FIG. 2, as shown, the lower portion 52A of the knuckle is connected to both the lower connection point 58 and to a toe link 53 which interconnects the lower portion 52A of the knuckle 52 to the chassis 12. The knuckle is pivotally moveable about an axis 55 through the lower connection point 58 and the connection of the lower portion 52A of the knuckle 52 to the toe link 53, as indicated by arrow 74 in FIG. 3B. The effective length 70 of the upper control arm 60 defines a camber angle 76 of the knuckle 52. Thus, referring again to FIG. 3A, when the effective length 70 of the upper control arm 60 is maximized, the camber angle 76 of the knuckle 52 is zero, meaning that the knuckle 52, as shown, is vertical. Referring again to FIG. 3B, when the effective length 70 of the upper control arm 60 is reduced, the upper portion 52B of the knuckle 52 is pulled inward, and the camber angle 76 of the knuckle 52 is more than zero, and the knuckle 52 is tilted inward toward the vehicle 10.

The camber gain link 68 is adapted to secure the pivotal connection points 64 of the inner segment 60A and the outer segment 60B and prevent pivotal movement of the inner segment 60A and the outer segment 60B relative to one another, thereby establishing a pivotal position of the inner segment 60A relative to the outer segment 60B, and the effective length 70 of the upper control arm 60 and the camber angle 76 of the knuckle 52.

The way a vehicle's wheels 16, 18 make contact with the road will make a big difference in how the vehicle 10 handles and how it responds to movements in the steering wheel. Small adjustments, such as the camber angle 76, can change responsiveness of the vehicle 10 and can have various benefits and drawbacks. Maintaining an optimal contact patch between the wheels 16, 18 and road surface (actual contact between tire and road surface) significantly impacts the available traction of the tire. Altering camber based on vehicle dynamic conditions improves suspension response and vehicle handling. Dynamically controlling camber allows for optimization of traction between lateral and longitudinal accelerations. Increased camber is applied to a tire to maximize the tire contact patch during lateral acceleration.

Changing the camber angle 76 is one of the most effective ways to adjust a vehicle suspension. The camber angle 76 is the angle of the wheels 16, 18 in relation to the rest of the chassis 12. Said another way, camber angle 76, for a specific wheel/tire 16, 18, is the angle between a vertical axis of that wheel/tire 16, 18 and a vertical axis of the vehicle 10 when viewed from the front or rear. The wheels 16, 18 may be angled inward, toward the vehicle 10, or outward, away from the vehicle 10, and both ways can change the feel of the suspension of the vehicle 10.

Negative camber is when the tops of the wheels 16, 18 are angled inward toward the center of the vehicle 10. This means that the bottoms are angled outward and that there is slightly less contact on the road for the inner part of the tires when the vehicle 10 is going straight. This adjustment can change the way the vehicle 10 steers and handles in turns, though, since there will be an increase in the contact patch when the vehicle 10 is cornering. During a turn, the whole vehicle 10 leans, which will decrease the amount of contact between the wheels 16, 18 and the surface of the road if the wheels 16, 18 have a neutral camber (camber angle 76 is zero) and are perfectly straight. If the wheels 16, 18 have a negative camber, this leaning of the vehicle 10 increases the amount of contact between the wheels 16, 18 and the surface of the road, providing better traction. Due to the increase in the contact patch when the vehicle 10 is leaning, negative camber also improves stability at higher speeds and reduces understeer.

However, because a vehicle 10 generally travels in a straight line a majority of the time, negative camber can increase tire wear, negatively affect fuel economy, reduce longitudinal traction, affect steering negatively due to camber thrust, and the vehicle 10 will have a harsher ride. Thus, it is advantageous to have the ability to selectively alter the effective length 70 of the upper control arm 60 to fine tune the camber characteristics of the vehicle 10. The camber gain link 68 includes a first distal end 68A that is connected to the upper control arm 60 at the pivotal connection 64 of the inner segment 60A and the outer segment 60B, and a second distal end 68B that is connected to the lower control arm 56. Changing a position of the pivotal connection 64 of the inner segment 60A and the outer segment 60B relative to the lower control arm 56, changes the effective length 70 of the upper control arm 60 and the camber angle 76 of the knuckle 52.

Referring again to FIG. 3A, the camber gain link 68 has a first length 78, and positions the pivotal connection 64 of the inner segment 60A and the outer segment 60B, such that the inner segment 60A and the outer segment 60B are oriented co-linearly, maximizing the effective length 70 of the upper control arm 60, and providing zero (neutral) camber angle 76. Referring again to FIG. 3B, the camber gain link 68 has a second length 80, that is shorter than the first length 78, and positions the pivotal connection 64 of the inner segment 60A and the outer segment 60B, such that the inner segment 60A and the outer segment 60B are oriented at an angle 72 relative to one another, reducing the effective length 70 of the upper control arm 60, and providing a non-zero camber angle 76, and negative camber. Thus, the suspension 50 can be tuned by relacing one component, the camber gain link 68, wherein, the length of the camber gain link 68 determines the camber angle 76. This allows a user of the vehicle 10 to selectively adjust the camber angle 76 depending on personal preference, anticipated driving conditions, or to correspond to other modifications and characteristics of the vehicle, such as ride height.

Figure 4A:
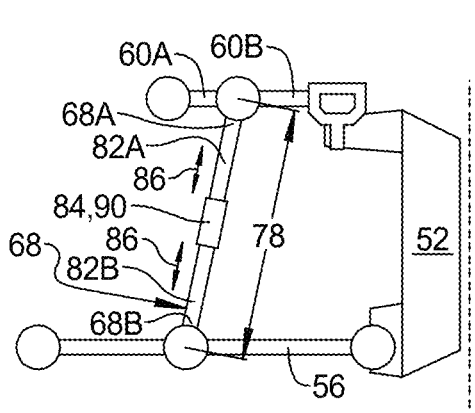
FIG. 4A is a side view of the suspension wherein a connection holds first and second sections of the camber gain link such that the camber gain link has a first length.

In an exemplary embodiment, the camber gain link 68 includes a first section 82A, a second section 82B and a connection 84 between the first section 82A and the second section 82B that is adapted to allow a position of the first section 82A and the second section 82B, relative to one another, to be changed, thereby allowing a length of the camber gain link 68 to be selectively changed. Referring to FIG. 4A, the connection 84 between the first section 82A and the second section 82B holds the first section 82A and the second section 82B in position relative to one another, wherein the camber gain link 68 has a first length 78, and positions the pivotal connection 64 of the inner segment 60A and the outer segment 60B, such that the inner segment 60A and the outer segment 60B are oriented co-linearly, maximizing the effective length 70 of the upper control arm 60, and providing zero (neutral) camber angle 76. The connection 84 between the first section 82A and the second section 82B is adapted to allow the first section 82A and the second section 82B to move relative to one another, as indicated by arrows 86.

Figure 4B:
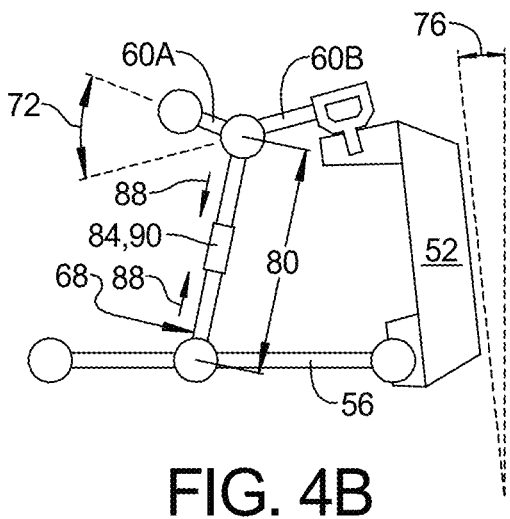
FIG. 4B is a side view of the suspension wherein the connection holds the first and second sections of the camber gain link such that the camber gain link has a second length.

Referring to FIG. 4B, the connection 84 between the first section 82A and the second section 82B allows the first section 82A and the second section 82B to move, from their relative positions in FIG. 4A, toward one another, as indicated by arrows 88 and holds the first section 82A and the second section 82B in position relative to one another, wherein the camber gain link 68 now has a second length 80, that is shorter than the first length 78, and positions the pivotal connection 64 of the inner segment 60A and the outer segment 60B, such that the inner segment 60A and the outer segment 60B are oriented at an angle 72 relative to one another, reducing the effective length 70 of the upper control arm 60, and providing a non-zero camber angle 76, and negative camber.

In an exemplary embodiment, the connection 84 between the first section 82A and the second section 82B of the camber gain link 68 includes a turnbuckle 90 adapted to allow the length of the camber gain link 68 to be selectively changed. The turnbuckle includes a threaded engagement with each of the first section 82A and the second section 82B, wherein, rotation of the turnbuckle 90 in a first direction (clockwise) will result in movement of the first section 82A and the second section 82B away from each other, and rotation of the turnbuckle 90 in a second direction (counter-clockwise) will result in movement of the first section 82A and the second section 82B toward each other. Thus, by rotation of the turnbuckle 90, the camber angle 76 can be selectively adjusted.

Figure 5:
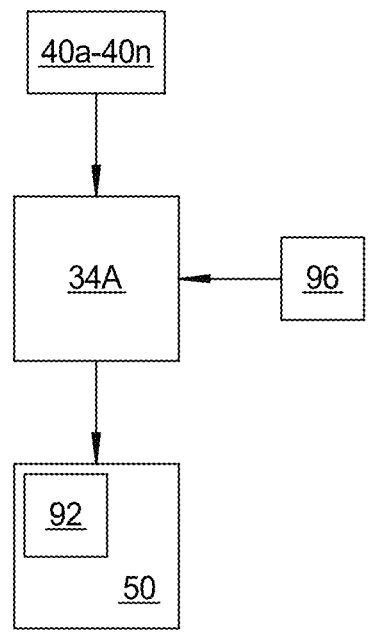
FIG. 5 is a schematic diagram of the suspension including an actuator connected to a system controller, a plurality of onboard sensors and a human machine interface (HMI)

Referring to FIG. 5, in an exemplary embodiment, the connection 84 between the first section 82A of the camber gain link 68 and the second section 82B of the camber gain link 68 includes an actuator 92 in communication with a system controller 34A that is adapted to automatically change the length of the camber gain link 68 based on data collected by the system controller 34A from the plurality of onboard sensors 40A-40B within the vehicle 10. The system controller 34A may be the vehicle controller 34, or may be a separate controller in communication with the system controller 34. Various ones of the plurality of onboard sensors 40a-40n are adapted to monitor and detect vehicle 10 operating conditions, wherein, the system controller 34A uses data from the plurality of onboard sensors 40a-40n to determine an optimum camber angle 76 based on such data.

Figure 6A:
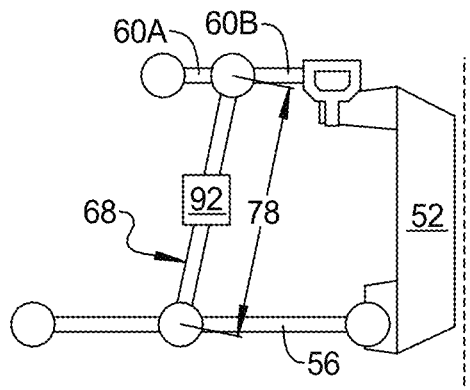
FIG. 6A is a side view of the suspension wherein an actuator holds first and second sections of the camber gain link such that the camber gain link has a first length.

Thus, for example, referring to FIG. 6A, when the vehicle 10 is traveling in a straight line, the system controller 34A will actuate the actuator 92 to move the first section 82A and the second section 82B and hold the first section 82A and the second section 82B in position relative to one another, wherein the camber gain link 68 has a first length 78, and positions the pivotal connection 64 of the inner segment 60A and the outer segment 60B, such that the inner segment 60A and the outer segment 60B are oriented co-linearly, maximizing the effective length 70 of the upper control arm 60, and providing zero (neutral) camber angle 76.

Figure 6B:
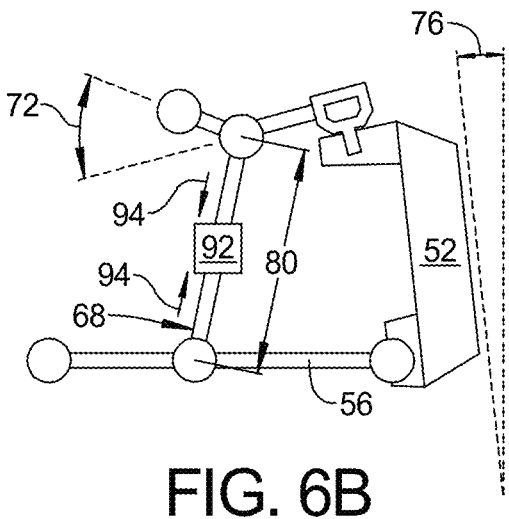
FIG. 6B is a side view of the suspension wherein the actuator holds the first and second sections of the camber gain link such that the camber gain link has a second length.

Referring to FIG. 6B, as the vehicle 10 enters a curve, the plurality of onboard sensors 40a-40n detects or calculates lateral forces on the vehicle 10, and sends such data to the system controller 34A, wherein the system controller 34A automatically actuates the actuator 92 to move the first section 82A and the second section 82B, from their relative positions in FIG. 6A, toward one another, as indicated by arrows 94, and holds the first section 82A and the second section 82B in position relative to one another, wherein the camber gain link 68 now has a second length 80, that is shorter than the first length 78, and positions the pivotal connection 64 of the inner segment 60A and the outer segment 60B, such that the inner segment 60A and the outer segment 60B are oriented at an angle 72 relative to one another, reducing the effective length 70 of the upper control arm 60, and providing a non-zero camber angle 76, and negative camber. As mentioned above, instructions of the vehicle controller 34 may be embodied in a trajectory planning system and, when executed by the at least one data processor 44, generate a trajectory output that addresses kinematic and dynamic constraints of the environment. For example, the instructions receive as input process sensor and map data, wherein position can be improved using sensors, and global positioning systems (GPS) and dead reckoning can improve resolution. Additionally cloud-based or on-board based road data can be used to refine for specific positions. For example, reference a track where a vehicle is lapping. That data can be stored and allow for optimizations of the system control, wherein, it is possible to have camber actively adjusted on entry or exit of a given corner based on stored data from the previous lap.

In another exemplary embodiment, the system controller 34A is adapted to receive instructions from a driver of the vehicle 10, via a human machine interface (HMI) 96 within the vehicle 10 and in communication with the system controller 34A. Thus, a driver within the vehicle 10 may choose to selectively change the camber angle 76 by actuating the actuator 92 manually, via the HMI. The actuator 92 is adapted to default to a pre-determined length of the camber gain link 68, wherein, upon failure of any of the plurality of onboard sensors 40a-40n, failure of the system controller 34A, or failure of the actuator 92, the actuator 92 will mechanically default to a pre-determined camber angle 76 that provides reasonable suspension characteristics until the failure can be repaired.

In various embodiments, the actuator 92 is one of a motor/gear arrangement, an electronic, hydraulic or pneumatic actuator, a linear actuator or solenoid. It should be understood by those skilled in the art that the actuator 92, may be any suitable device adapted to moveably hold the first section 82A and the second section 82B in position relative to one another.

Figure 7A:
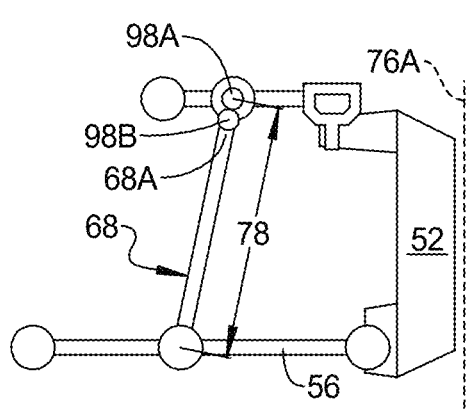
FIG. 7A is a side view of the suspension wherein a first distal end of the camber gain link is connected to the upper control arm at a first camber gain link connection point.
Figure 7B:
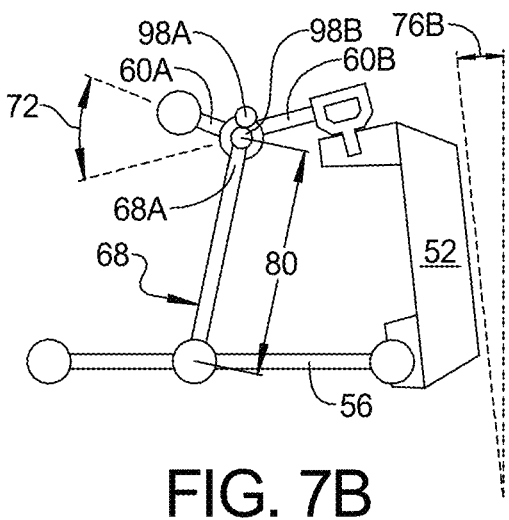
FIG. 7B is a side view of the suspension wherein the first distal end of the camber gain link is connected to the upper control arm at a second camber gain link connection point.

Referring to FIG. 7A and FIG. 7B, in another exemplary embodiment, the first distal end 68A of the camber gain link 68 includes a first camber gain link connection point 98A and a second camber gain link connection point 98B. Referring to FIG. 7A, connection of the first distal end 68A of the camber gain link 68 to the upper control arm 60 at the first camber gain link connection point 98A defines a first position of the pivotal connection 64 of the inner segment 60A and the outer segment 60B relative to the lower control arm 56 and a first camber angle 76A of the knuckle 52. As shown, when the first distal end 68A of the camber gain link 68 is connected to the upper control arm 60 at the first camber gain link connection point 98A the camber gain link 68 has a first length 78, and positions the pivotal connection 64 of the inner segment 60A and the outer segment 60B, such that the inner segment 60A and the outer segment 60B are oriented co-linearly, maximizing the effective length 70 of the upper control arm 60, and providing the first camber angle 76A that is zero (neutral).

Referring to FIG. 7B, connection of the first distal end 68A of the camber gain link 68 to the upper control arm 60 at the second camber gain link connection point 98B defines a second position of the pivotal connection 64 of the inner segment 60A and the outer segment 60B relative to the lower control arm 56 and a second camber angle 76B of the knuckle 52. When the first distal end 68A of the camber gain link 68 is connected to the upper control arm 60 at the second camber gain link connection point 98B, the camber gain link 68 now has a second length 80 (an effective length), that is shorter than the first length 78, and positions the pivotal connection 64 of the inner segment 60A and the outer segment 60B, such that the inner segment 60A and the outer segment 60B are oriented at an angle 72 relative to one another, reducing the effective length 70 of the upper control arm 60, and providing a non-zero second camber angle 76B, and negative camber.

Figure 8A:
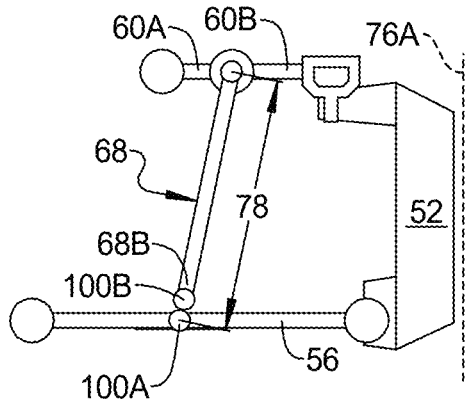
FIG. 8A is a side view of the suspension wherein a second distal end of the camber gain link is connected to the lower control arm at a first camber gain link connection point.
Figure 8B:
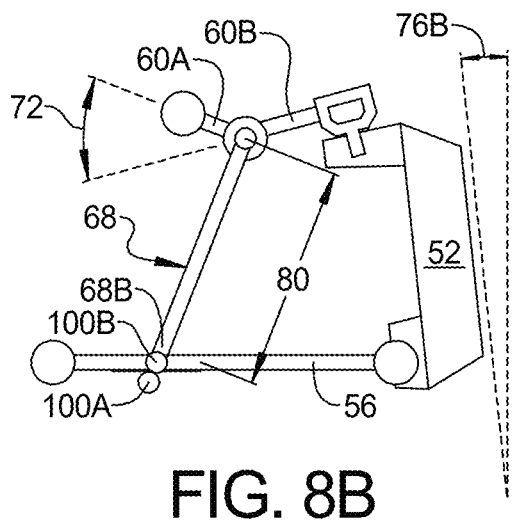
FIG. 8B is a side view of the suspension wherein the second distal end of the camber gain link is connected to the lower control arm at a second camber gain link connection point.

Referring to FIG. 8A and FIG. 8B, in another exemplary embodiment, the second distal end 68B of the camber gain link 68 includes a first camber gain link connection point 100A and a second camber gain link connection point 100B. Referring to FIG. 8A, connection of the second distal end 68B of the camber gain link 68 to the lower control arm 56 at the first camber gain link connection point 100A defines a first position of the pivotal connection 64 of the inner segment 60A and the outer segment 60B relative to the lower control arm 56 and a first camber angle 76A of the knuckle 52. As shown, when the second distal end 68B of the camber gain link 68 is connected to the lower control arm 56 at the first camber gain link connection point 100A the camber gain link 68 has a first length 78, and positions the pivotal connection 64 of the inner segment 60A and the outer segment 60B, such that the inner segment 60A and the outer segment 60B are oriented co-linearly, maximizing the effective length 70 of the upper control arm 60, and providing the first camber angle 76A that is zero (neutral).

Referring to FIG. 8B, connection of the second distal end 68A of the camber gain link 68 to the lower control arm 56 at the second camber gain link connection point 100B defines a second position of the pivotal connection 64 of the inner segment 60A and the outer segment 60B relative to the lower control arm 56 and a second camber angle 76B of the knuckle 52. When the second distal end 68A of the camber gain link 68 is connected to the lower control arm 56 at the second camber gain link connection point 100B, the camber gain link 68 now has a second length 80 (an effective length), that is shorter than the first length 78, and positions the pivotal connection 64 of the inner segment 60A and the outer segment 60B, such that the inner segment 60A and the outer segment 60B are oriented at an angle 72 relative to one another, reducing the effective length 70 of the upper control arm 60, and providing a non-zero second camber angle 76B, and negative camber.

Figure 9A:
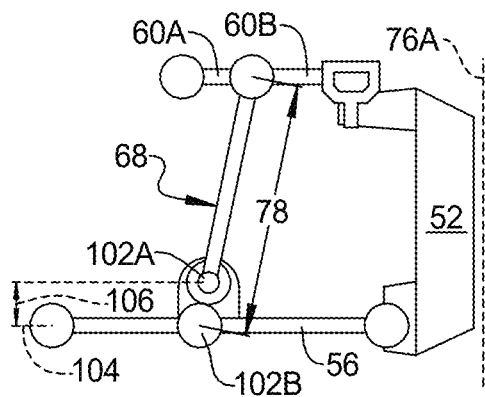
FIG. 9A is a side view of the suspension wherein the second distal end of the camber gain link is connected to a first connection point of the lower control arm that is offset from an axis of the lower control arm.
Figure 9B:
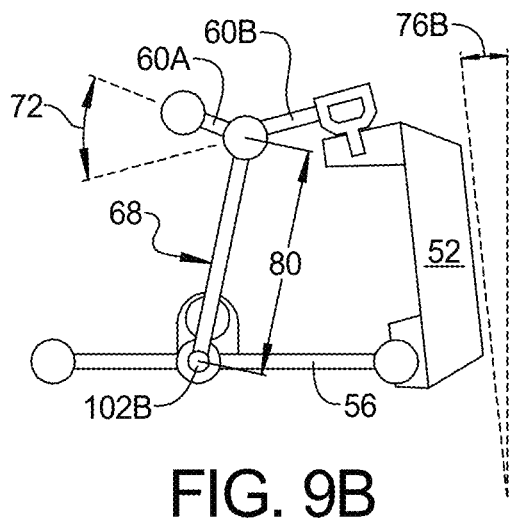
FIG. 9B is a side view of the suspension wherein the second distal end of the camber gain link is connected to a second connection point of the lower control arm that is along the axis of the lower control arm.

Referring to FIG. 9A and FIG. 9B, in another exemplary embodiment, the lower control arm 56 includes a first connection point 102A, offset from an axis 104 of the lower control arm 56, and a second connection point 102B, along the axis 104 of the lower control arm 56. Referring to FIG. 9A, connection of the second distal end 68B of the camber gain link 68 to the lower control arm 56 at the first connection point 102A defines a first position of the pivotal connection 64 of the inner segment 60A and the outer segment 60B relative to the lower control arm 56 and a first camber angle 76A of the knuckle 52. As shown, when the second distal end 68B of the camber gain link 68 is connected to the lower control arm 56 at the first connection point 102A the camber gain link 68 has a first length 78. The first length 78 is an effective length comprising the actual distance between the first and second distal ends 68A, 68B of the camber gain link 68 plus the distance 106 that the first connection point 102A is offset from the axis 104 of the lower control arm 56. Thus, the offset of the first connection point adds to the effective length of the camber gain link 68. This connection positions the pivotal connection 64 of the inner segment 60A and the outer segment 60B, such that the inner segment 60A and the outer segment 60B are oriented co-linearly, maximizing the effective length 70 of the upper control arm 60, and providing the first camber angle 76A that is zero (neutral).

Referring to FIG. 9B, connection of the second distal end 68A of the camber gain link 68 to the lower control arm 56 at the second connection point 102B defines a second position of the pivotal connection 64 of the inner segment 60A and the outer segment 60B relative to the lower control arm 56 and a second camber angle 76B of the knuckle 52. When the second distal end 68A of the camber gain link 68 is connected to the lower control arm 56 at the second connection point 102B, the camber gain link 68 now has a second length 80, that is shorter (less the offset distance 106) than the first length 78, and positions the pivotal connection 64 of the inner segment 60A and the outer segment 60B, such that the inner segment 60A and the outer segment 60B are oriented at an angle 72 relative to one another, reducing the effective length 70 of the upper control arm 60, and providing a non-zero second camber angle 76B, and negative camber.

Figure 10A:
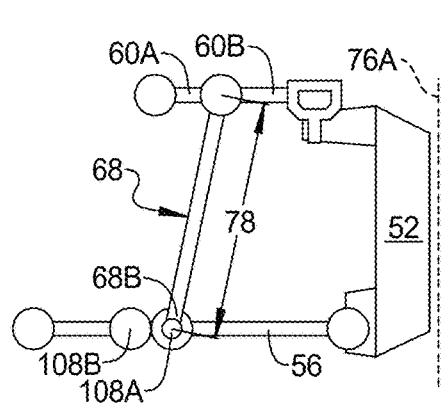
FIG. 10A is a side view of the suspension wherein the second distal end of the camber gain link is connected to a first connection point of the lower control arm that is along the axis of the lower control arm.
Figure 10B:
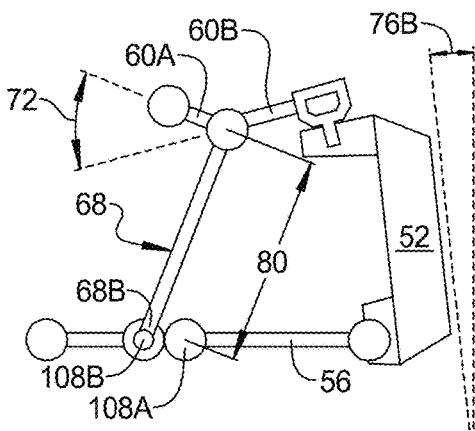
FIG. 10B is a side view of the suspension wherein the second distal end of the camber gain link is connected to a second connection point of the lower control arm that is along the axis of the lower control arm and spaced from the first connection point of the lower control arm.

Referring to FIG. 10A and FIG. 10B, in another exemplary embodiment, the lower control arm 56 includes a first connection point 108A, along the axis 104 of the lower control arm 56, and a second connection point 108B, along the axis 104 of the lower control arm 56 and spaced from the first connection point 108A. Referring to FIG. 10A, connection of the second distal end 68B of the camber gain link 68 to the lower control arm 56 at the first connection point 108A defines a first position of the pivotal connection 64 of the inner segment 60A and the outer segment 60B relative to the lower control arm 56 and a first camber angle 76A of the knuckle 52. As shown, when the second distal end 68B of the camber gain link 68 is connected to the lower control arm 56 at the first connection point 108A the camber gain link 68 has a first length 78 and positions the pivotal connection 64 of the inner segment 60A and the outer segment 60B, such that the inner segment 60A and the outer segment 60B are oriented co-linearly, maximizing the effective length 70 of the upper control arm 60, and providing the first camber angle 76A that is zero (neutral).

Referring to FIG. 10B, connection of the second distal end 68A of the camber gain link 68 to the lower control arm 56 at the second connection point 108B defines a second position of the pivotal connection 64 of the inner segment 60A and the outer segment 60B relative to the lower control arm 56 and a second camber angle 76B of the knuckle 52. When the second distal end 68A of the camber gain link 68 is connected to the lower control arm 56 at the second connection point 108B, the angular orientation of the camber gain link 68 is changed, decreasing a distance between the upper control arm 60 and the lower control arm 56. In other words, the distance from the connection of the first distal end 68A of the camber gain link 68 to the first connection point 108A of the lower control arm 56 now has a second length 80, that is shorter (due to movement of the second distal end 68B of the camber gain link 68 away from the first connection point 108A) than the first length 78, and positions the pivotal connection 64 of the inner segment 60A and the outer segment 60B, such that the inner segment 60A and the outer segment 60B are oriented at an angle 72 relative to one another, reducing the effective length 70 of the upper control arm 60, and providing a non-zero second camber angle 76B, and negative camber.

Figure 11:
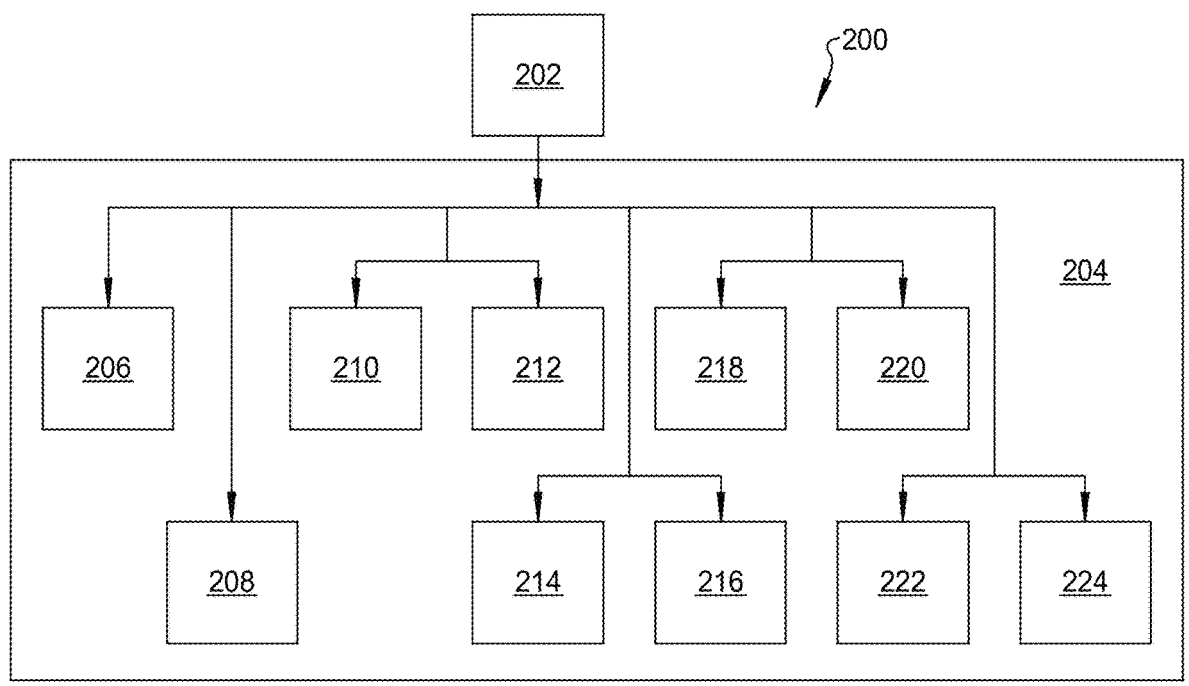
FIG. 11 is a schematic flow chart illustrating a method according to an exemplary embodiment of the present disclosure.

Referring to FIG. 11, a method 200 of controlling camber angle 76 within the suspension 50 described above includes, starting at block 202, securing, with the camber gain link 68, the pivotal connection of the inner segment 60A and the outer segment 60B and preventing pivotal movement of the inner segment 60A and the outer segment 60B relative to one another, thereby establishing a pivotal position of the inner segment 60A relative to the outer segment 60B, the effective length 70 of the upper control arm 60 and the camber angle 76 of the knuckle 52.

In an exemplary embodiment, the method 200 further includes, moving to block 204, changing a position of the pivotal connection 64 of the inner segment 60A and the outer segment 60B relative to the lower control arm 56, changing the effective length 70 of the upper control arm 60 and the camber angle 76 of the knuckle 52.

In an exemplary embodiment, the changing a position of the pivotal connection 64 of the inner segment 60A and the outer segment 60B relative to the lower control arm 56, changing the effective length 70 of the upper control arm 60 and the camber angle 76 of the knuckle 52 at block 204 further includes, moving to block 206, changing, with the connection 84 between the first section 82A and the second section 82B, a position of the first section 82A and the second section 82B relative to one another, and changing a length of the camber gain link 68.

In another exemplary embodiment, wherein the connection 84 between the first section 82A of the camber gain link 68 and the second section 82B of the camber gain link 68 includes an actuator 92 in communication with a system controller 34A that is adapted to automatically change the length of the camber gain link 68 based on data collected by the system controller 34A from a plurality of onboard sensors 40*a*-40*n* within the vehicle 10, wherein the changing, with the connection 84 between the first section 82A and the second section 82B, a position of the first section 82A and the second section 82B relative to one another at block 204 further includes, moving to block 208 automatically actuating, with the system controller 34A, the actuator 92 based on data collected by the system controller 34A from the plurality of onboard sensors 40*a*-40*n*.

In another exemplary embodiment, wherein the first distal end 68A of the camber gain link 68 includes a first camber gain link connection point 98A and a second camber gain link connection point 98B, wherein connection of the first distal end 68A of the camber gain link 68 to the upper control arm 60 at the first camber gain link connection point 98A defines a first position of the pivotal connection 64 of the inner segment 60A and the outer segment 60B relative to the lower control arm 56 and a first camber angle 76A of the knuckle 52, and connection of the first distal end 68A of the camber gain link 68 to the upper control arm 60 at the second camber gain link connection point 98B defines a second position of the pivotal connection 64 of the inner segment 60A and the outer segment 60B relative to the lower control arm 56 and a second camber angle 76B of the knuckle 52, and the changing a position of the pivotal connection 64 of the inner segment 60A and the outer segment 60B relative to the lower control arm 56, changing the effective length 70 of the upper control arm 60 and the camber angle 76 of the knuckle 52 at block 204 further includes one of, moving to block 210, disconnecting the first distal end 68A of the camber gain link 68 from the upper control arm 60 at the first camber gain link connection point 98A and connecting the first distal end 68A of the camber gain link 68 to the upper control arm 60 at the second camber gain link connection point 98B, or, moving to block 212, disconnecting the first distal end 68A of the camber gain link 68 from the upper control arm 60 at the second camber gain link connection point 98B and connecting the first distal end 68A of the camber gain link 68 to the upper control arm 60 at the first camber gain link connection point 98A.

In another exemplary embodiment, wherein the second distal end 68B of the camber gain link 68 includes a first camber gain link connection point 100A and a second camber gain link connection point 100B, and wherein connection of the second distal end 68B of the camber gain link 68 to the lower control arm 56 at the first camber gain link connection point 100A defines a first position of the pivotal connection 64 of the inner segment 60A and the outer segment 60B relative to the lower control arm 56 and a first camber angle 76A of the knuckle 52, and connection of the second distal end 68B of the camber gain link 68 to the lower control arm 56 at the second camber gain link connection point 100B defines a second position of the pivotal connection 64 of the inner segment 60A and the outer segment 60B relative to the lower control arm 56 and a second camber angle 76B of the knuckle 52, and, the changing a position of the pivotal connection 64 of the inner segment 60A and the outer segment 60B relative to the lower control arm 56, changing the effective length 70 of the upper control arm 60 and the camber angle 76 of the knuckle 52 at block 204 further includes one of, moving to block 214, disconnecting the second distal end 68B of the camber gain link 68 from the lower control arm 56 at the first camber gain link connection point 100A and connecting the second distal end 68B of the camber gain link 68 to the lower control arm 56 at the second camber gain link connection point 100B, or, moving to block 216, disconnecting the second distal end 68A of the camber gain link 68 from the lower control arm 56 at the second camber gain link connection point 100B and connecting the second distal end 68B of the camber gain link 68 to the lower control arm 56 at the first camber gain link connection point 100A.

In another exemplary embodiment, wherein the lower control arm 56 includes a first connection point 102A, offset from an axis 104 of the lower control arm 56, and a second connection point 102B, along the axis 104 of the lower control arm 56, and wherein connection of the second distal end 68B of the camber gain link 68 to the first connection point 102A of the lower control arm 56 defines a first position of the pivotal connection 64 of the inner segment 60A and the outer segment 60B relative to the lower control arm 56 and a first camber angle 76A of the knuckle 52, and connection of the second distal end 68B of the camber gain link 68 to the second connection point 102B of the lower control arm 56 defines a second position of the pivotal connection 64 of the inner segment 60A and the outer segment 60B relative to the lower control arm 56 and a second camber angle 76B of the knuckle 52, and, the changing a position of the pivotal connection 64 of the inner segment 60A and the outer segment 60B relative to the lower control arm 56, changing the effective length 70 of the upper control arm 60 and the camber angle 76 of the knuckle 52 at block 204 further includes one of, moving to block 218, disconnecting the second distal end 68B of the camber gain link 68 from the lower control arm 56 at the first connection point 102A of the lower control arm 56 and connecting the second distal end 68B of the camber gain link 68 to the lower control arm 56 at the second connection point 102B of the lower control arm 56, or, moving to block 220, disconnecting the second distal end 68B of the camber gain link 68 from the lower control arm 56 at the second connection point 102 of the lower control arm 56 and connecting the second distal end 68B of the camber gain link 68 to the lower control arm 56 at the first connection point 102A of the lower control arm 56.

In another exemplary embodiment, wherein the lower control arm 56 includes a first connection point 108A, along an axis 104 of the lower control arm 56, and a second connection point 108B, along the axis 104 of the lower control arm 56 and spaced from the first connection point 108A, and wherein connection of the second distal end 68B of the camber gain link 68 to the first connection point 108A of the lower control arm 56 defines a first position of the pivotal connection 64 of the inner segment 60A and the outer segment 60B relative to the lower control arm 56 and a first camber angle 76A of the knuckle 52, and connection of the second distal end 68B of the camber gain link 68 to the second connection point 108B of the lower control arm 56 defines a second position of the pivotal connection 64 of the inner segment 60A and the outer segment 60B relative to the lower control arm 56 and a second camber angle 76B of the knuckle 52, and the changing a position of the pivotal connection 64 of the inner segment 60A and the outer segment 60B relative to the lower control arm 56, changing the effective length 70 of the upper control arm 60 and the camber angle 76 of the knuckle 52 at block 204 further includes one of, moving to block 222, disconnecting the second distal end 68B of the camber gain link 68 from the lower control arm 56 at the first connection point 108A of the lower control arm 56 and connecting the second distal end 68B of the camber gain link 68 to the lower control arm 56 at the second connection point 108B of the lower control arm 56, or, moving to block 224, disconnecting the second distal end 68B of the camber gain link 68 from the lower control arm 56 at the second connection point 108B of the lower control arm 56 and connecting the second distal end 68B of the camber gain link 68 to the lower control arm 56 at the first connection point 108A of the lower control arm 56.

A suspension and method of the present disclosure offers the advantage of allowing easy manual or automatic adjustment of camber angle within the suspension to accommodate different driving conditions or vehicle characteristics.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A suspension for a vehicle, comprising:
    a knuckle adapted to support a wheel hub;
    a lower control arm interconnecting a lower portion of the knuckle, at a lower connection point, to a structural member of the vehicle, wherein the lower control arm is pivotally connected to the structural member of the vehicle and pivotally connected to the lower portion of the knuckle;
    an upper control arm interconnecting an upper portion of the knuckle to the structural member of the vehicle and including an inner segment and an outer segment, wherein:
        the inner segment of the upper control arm is pivotally connected to the structural member of the vehicle;
        the outer segment of the upper control arm is connected to the upper portion of the knuckle at an upper connection point; and
        the inner segment and the outer segment are pivotally connected to one another; and
    a camber gain link interconnecting the upper control arm and the lower control arm, the camber gain link connected to the upper control arm at the pivotal connection of the inner segment and the outer segment;
    a pivotal position of the inner segment relative to the outer segment defining a lateral distance between the pivotal connection of the inner segment to the structural member of the vehicle and the upper connection point and an effective length of the upper control arm;
    the knuckle pivotally moveable about the lower connection point, such that the effective length of the upper control arm defines a camber angle of the knuckle; and
    the camber gain link adapted to secure the pivotal connection of the inner segment and the outer segment and prevent pivotal movement of the inner segment and the outer segment relative to one another, thereby establishing a pivotal position of the inner segment relative to the outer segment, the effective length of the upper control arm and the camber angle of the knuckle, and including a first distal end that is connected to the upper control arm at the pivotal connection of the inner segment and the outer segment, and a second distal end that is connected to the lower control arm;
    wherein, changing a position of the pivotal connection of the inner segment and the outer segment relative to the lower control arm, changes the effective length of the upper control arm and the camber angle of the knuckle.

2. The suspension of claim 1, wherein the camber gain link includes a first section, a second section and a connection between the first section and the second section that is adapted to allow a position of the first section and the second section, relative to one another, to be changed, thereby allowing a length of the camber gain link to be selectively changed.

3. The suspension of claim 2, wherein the connection between the first section and the second section of the camber gain link includes a turnbuckle adapted to allow the length of the camber gain link to be selectively changed.

4. The suspension of claim 2, wherein the connection between the first section of the camber gain link and the second section of the camber gain link includes an actuator in communication with a system controller that is adapted to automatically change the length of the camber gain link based on data collected by the system controller from a plurality of onboard sensors within the vehicle.

5. The suspension of claim 4, wherein the actuator is adapted to default to a pre-determined length of the camber gain link.

6. The suspension of claim 4, wherein the actuator is one of a motor/gear arrangement, an electronic, hydraulic or pneumatic actuator, a linear actuator or solenoid.

7. The suspension of claim 1, wherein the first distal end of the camber gain link includes a first camber gain link connection point and a second camber gain link connection point;
    wherein:
        connection of the first distal end of the camber gain link to the upper control arm at the first camber gain link connection point defines a first position of the pivotal connection of the inner segment and the outer segment relative to the lower control arm and a first camber angle of the knuckle; and
        connection of the first distal end of the camber gain link to the upper control arm at the second camber gain link connection point defines a second position of the pivotal connection of the inner segment and the outer segment relative to the lower control arm and a second camber angle of the knuckle.

8. The suspension of claim 1, wherein the second distal end of the camber gain link includes a first camber gain link connection point and a second camber gain link connection point;
    wherein:
        connection of the second distal end of the camber gain link to the lower control arm at the first camber gain link connection point defines a first position of the pivotal connection of the inner segment and the outer segment relative to the lower control arm and a first camber angle of the knuckle; and
        connection of the second distal end of the camber gain link to the lower control arm at the second camber gain link connection point defines a second position of the pivotal connection of the inner segment and the outer segment relative to the lower control arm and a second camber angle of the knuckle.

9. The suspension of claim 1, wherein the lower control arm includes a first connection point, offset from an axis of the lower control arm, and a second connection point, along the axis of the lower control arm;
    wherein:
        connection of the second distal end of the camber gain link to the first connection point of the lower control arm defines a first position of the pivotal connection of the inner segment and the outer segment relative to the lower control arm and a first camber angle of the knuckle; and
        connection of the second distal end of the camber gain link to the second connection point of the lower control arm defines a second position of the pivotal connection of the inner segment and the outer segment relative to the lower control arm and a second camber angle of the knuckle.

10. The suspension of claim 1, wherein the lower control arm includes a first connection point, along an axis of the lower control arm, and a second connection point, along the axis of the lower control arm and spaced from the first connection point;
wherein:
connection of the second distal end of the camber gain link to the first connection point of the lower control arm defines a first position of the pivotal connection of the inner segment and the outer segment relative to the lower control arm and a first camber angle of the knuckle; and
connection of the second distal end of the camber gain link to the second connection point of the lower control arm defines a second position of the pivotal connection of the inner segment and the outer segment relative to the lower control arm and a second camber angle of the knuckle.

11. The suspension of claim 1, wherein:
the camber gain link includes a first length, wherein the pivotal connection of the inner segment and the outer segment is positioned such that the inner segment and the outer segment are oriented co-linearly; and
the camber gain link includes a second length, shorter than the first length, wherein the pivotal connection of the inner segment and the outer segment is positioned such that the inner segment and the outer segment are oriented at an angle relative to one another.

12. A method of controlling camber angle within a suspension for a vehicle, the suspension including:
a knuckle adapted to support a wheel hub;
a lower control arm interconnecting a lower portion of the knuckle, at a lower connection point, to a structural member of the vehicle, wherein the lower control arm is pivotally connected to the structural member of the vehicle and pivotally connected to the lower portion of the knuckle;
an upper control arm interconnecting an upper portion of the knuckle to the structural member of the vehicle and including an inner segment and an outer segment, wherein:
the inner segment of the upper control arm is pivotally connected to the structural member of the vehicle;
the outer segment of the upper control arm is connected to the upper portion of the knuckle at an upper connection point; and
the inner segment and the outer segment are pivotally connected to one another; and
a camber gain link interconnecting the upper control arm and the lower control arm, the camber gain link connected to the upper control arm at the pivotal connection of the inner segment and the outer segment;
a pivotal position of the inner segment relative to the outer segment defining a lateral distance between the pivotal connection of the inner segment to the structural member of the vehicle and the upper connection point and an effective length of the upper control arm; and
the knuckle pivotally moveable about the lower connection point, such that the effective length of the upper control arm defines a camber angle of the knuckle;
the method including:
securing, with the camber gain link, the pivotal connection of the inner segment and the outer segment and preventing pivotal movement of the inner segment and the outer segment relative to one another, thereby establishing a pivotal position of the inner segment relative to the outer segment, the effective length of the upper control arm and the camber angle of the knuckle; and
wherein the camber gain link includes a first distal end that is connected to the upper control arm at the pivotal connection of the inner segment and the outer segment, and a second distal end that is connected to the lower control arm;
the method further including:
changing a position of the pivotal connection of the inner segment and the outer segment relative to the lower control arm, changing the effective length of the upper control arm and the camber angle of the knuckle.

13. The method of claim 12, wherein the camber gain link includes a first section, a second section and a connection between the first section and the second section, and the changing a position of the pivotal connection of the inner segment and the outer segment relative to the lower control arm, changing the effective length of the upper control arm and the camber angle of the knuckle further includes changing, with the connection between the first section and the second section, a position of the first section and the second section relative to one another, and changing a length of the camber gain link.

14. The method of claim 13, wherein the connection between the first section of the camber gain link and the second section of the camber gain link includes an actuator in communication with a system controller that is adapted to automatically change the length of the camber gain link based on data collected by the system controller from a plurality of onboard sensors within the vehicle, wherein the changing, with the connection between the first section and the second section, a position of the first section and the second section relative to one another further includes automatically actuating, with the system controller, the actuator based on data collected by the system controller from the plurality of onboard sensors.

15. The method of claim 12, wherein the first distal end of the camber gain link includes a first camber gain link connection point and a second camber gain link connection point, wherein connection of the first distal end of the camber gain link to the upper control arm at the first camber gain link connection point defines a first position of the pivotal connection of the inner segment and the outer segment relative to the lower control arm and a first camber angle of the knuckle, and connection of the first distal end of the camber gain link to the upper control arm at the second camber gain link connection point defines a second position of the pivotal connection of the inner segment and the outer segment relative to the lower control arm and a second camber angle of the knuckle; and
the changing a position of the pivotal connection of the inner segment and the outer segment relative to the lower control arm, changing the effective length of the upper control arm and the camber angle of the knuckle further includes one of:
disconnecting the first distal end of the camber gain link from the upper control arm at the first camber gain link connection point and connecting the first distal end of the camber gain link to the upper control arm at the second camber gain link connection point; or disconnecting the first distal end of the camber gain link from the upper control arm at the second camber gain link connection point and connecting the first distal end of the camber gain link to the upper control arm at the first camber gain link connection point.

16. The method of claim 12, wherein the second distal end of the camber gain link includes a first camber gain link connection point and a second camber gain link connection point, and wherein connection of the second distal end of the camber gain link to the lower control arm at the first camber gain link connection point defines a first position of the pivotal connection of the inner segment and the outer segment relative to the lower control arm and a first camber angle of the knuckle, and connection of the second distal end of the camber gain link to the lower control arm at the second camber gain link connection point defines a second position of the pivotal connection of the inner segment and the outer segment relative to the lower control arm and a second camber angle of the knuckle; and the changing a position of the pivotal connection of the inner segment and the outer segment relative to the lower control arm, changing the effective length of the upper control arm and the camber angle of the knuckle further includes one of:
disconnecting the second distal end of the camber gain link from the lower control arm at the first camber gain link connection point and connecting the second distal end of the camber gain link to the lower control arm at the second camber gain link connection point; or
disconnecting the second distal end of the camber gain link from the lower control arm at the second camber gain link connection point and arm at the first camber gain link connection point.

17. The method of claim 12, wherein the lower control arm includes a first connection point, offset from an axis of the lower control arm, and a second connection point, along the axis of the lower control arm, and wherein connection of the second distal end of the camber gain link to the first connection point of the lower control arm defines a first position of the pivotal connection of the inner segment and the outer segment relative to the lower control arm and a first camber angle of the knuckle, and connection of the second distal end of the camber gain link to the second connection point of the lower control arm defines a second position of the pivotal connection of the inner segment and the outer segment relative to the lower control arm and a second camber angle of the knuckle; and the changing a position of the pivotal connection of the inner segment and the outer segment relative to the lower control arm, changing the effective length of the upper control arm and the camber angle of the knuckle further includes one of:
disconnecting the second distal end of the camber gain link from the lower control arm at the first connection point of the lower control arm and connecting the second distal end of the camber gain link to the lower control arm at the second connection point of the lower control arm; or
disconnecting the second distal end of the camber gain link from the lower control arm at the second connection point of the lower control arm and arm at the first connection point of the lower control arm.

18. The method of claim 12, wherein the lower control arm includes a first connection point, along an axis of the lower control arm, and a second connection point, along the axis of the lower control arm and spaced from the first connection point, and wherein connection of the second distal end of the camber gain link to the first connection point of the lower control arm defines a first position of the pivotal connection of the inner segment and the outer segment relative to the lower control arm and a first camber angle of the knuckle, and connection of the second distal end of the camber gain link to the second connection point of the lower control arm defines a second position of the pivotal connection of the inner segment and the outer segment relative to the lower control arm and a second camber angle of the knuckle; and the changing a position of the pivotal connection of the inner segment and the outer segment relative to the lower control arm, changing the effective length of the upper control arm and the camber angle of the knuckle further includes one of:
disconnecting the second distal end of the camber gain link from the lower control arm at the first connection point of the lower control arm and connecting the second distal end of the camber gain link to the lower control arm at the second connection point of the lower control arm; or
disconnecting the second distal end of the camber gain link from the lower control arm at the second connection point of the lower control arm and arm at the first connection point of the lower control arm.

19. The method of claim 12, further including:
positioning the pivotal connection of the inner segment and the outer segment such that the inner segment and the outer segment are oriented co-linearly and the camber gain link has a first length; or
positioning the pivotal connection of the inner segment and the outer segment such that the inner segment and the outer segment are oriented at an angle relative to one another and the camber gain link has a second length, shorter than the first length.

20. A vehicle having a suspension with selectable passive and automatic control of camber angle, comprising:
a knuckle adapted to support a wheel hub;
a lower control arm interconnecting a lower portion of the knuckle, at a lower connection point, to a structural member of the vehicle, wherein the lower control arm is pivotally connected to the structural member of the vehicle and pivotally connected to the lower portion of the knuckle;
an upper control arm interconnecting an upper portion of the knuckle to the structural member of the vehicle and including an inner segment and an outer segment, wherein:
the inner segment of the upper control arm is pivotally connected to the structural member of the vehicle;
the outer segment of the upper control arm is connected to the upper portion of the knuckle at an upper connection point; and
the inner segment and the outer segment are pivotally connected to one another; and
a camber gain link interconnecting the upper control arm and the lower control arm, the camber gain link having a first section with a first distal end that is connected to the upper control arm at the pivotal connection of the inner segment and the outer segment, a second section with a second distal end that is connected to the lower control arm, and a connection between the first section and the second section that includes an actuator in communication with a system controller that is adapted to automatically change the length of the camber gain link based on data collected by the system controller from a plurality of onboard sensors within the vehicle;

wherein, a pivotal position of the inner segment relative to the outer segment defines a lateral distance between the pivotal connection of the inner segment to the structural member of the vehicle and the upper connection point and an effective length of the upper control arm;

the knuckle is pivotally moveable about the lower connection point, such that the effective length of the upper control arm defines a camber angle of the knuckle; and the camber gain link secures the pivotal connection of the inner segment and the outer segment and prevents pivotal movement of the inner segment and the outer segment relative to one another, thereby establishing a pivotal position of the inner segment relative to the outer segment, the effective length of the upper control arm and the camber angle of the knuckle, and wherein, changing the length of the camber gain link changes the position of the pivotal connection of the inner segment and the outer segment relative to the lower control arm, changes the effective length of the upper control arm and the camber angle of the knuckle.

\* \* \* \* \*